UNITED STATES PATENT OFFICE.

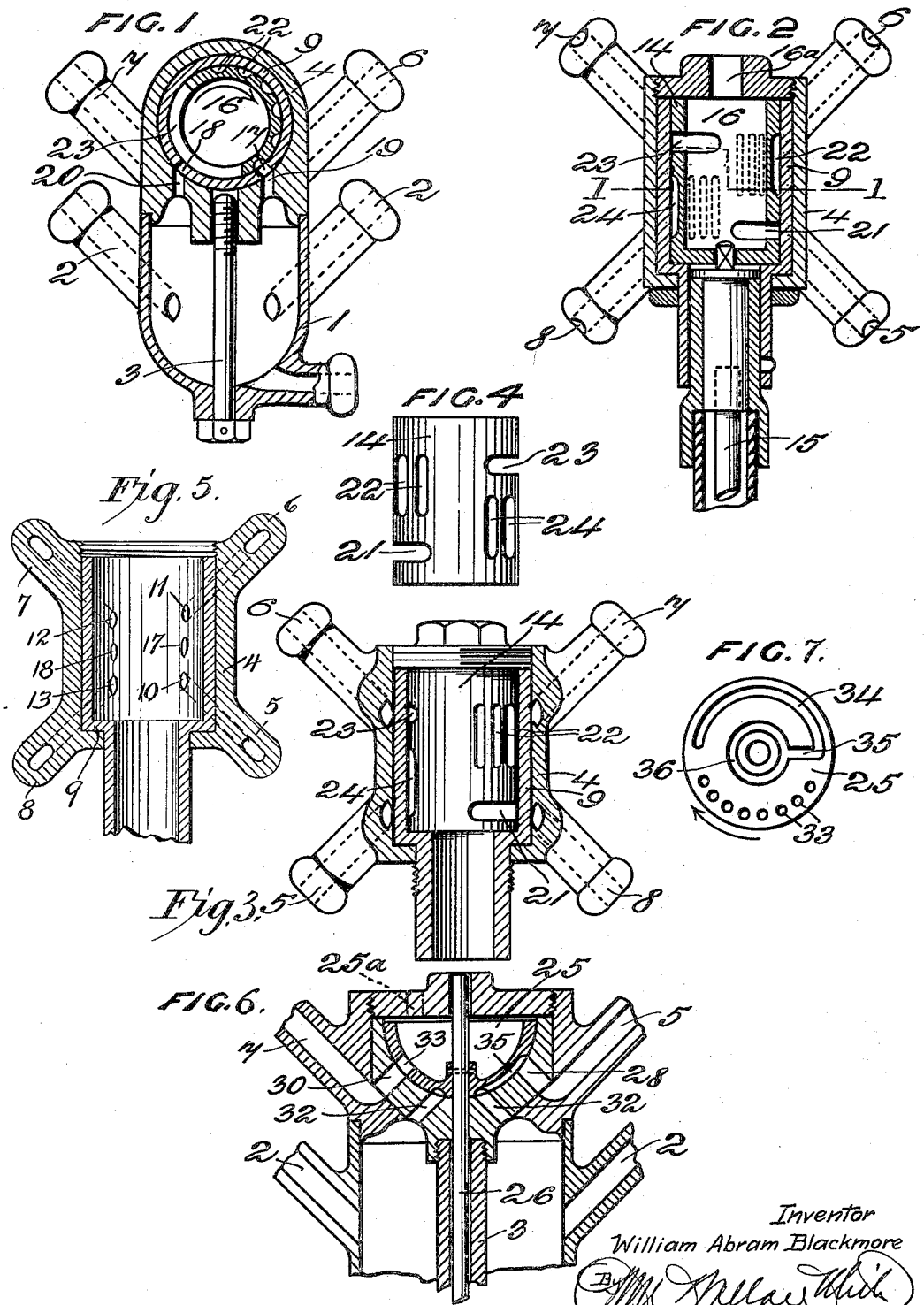

WILLIAM ABRAM BLACKMORE, OF CHRISTCHURCH, NEW ZEALAND.

PULSATOR FOR MILKING-MACHINES.

1,400,792.

Specification of Letters Patent.  Patented Dec. 20, 1921.

Application filed November 24, 1916. Serial No. 133,102.

*To all whom it may concern:*

Be it known that I, WILLIAM ABRAM BLACKMORE, a subject of the King of Great Britain, residing at 189 Cashel street, Christchurch, in the Dominion of New Zealand, have invented a new and useful Improvement in Pulsators for Milking-Machines, of which the following is a specification.

This invention relates to pulsators for use in operating the teat-cups of milking-machines and refers to that type of pulsator which is mounted upon or combined with, or incorporated in what is termed the "claw" or device for making the necessary connections to each set of teat-cups.

As formerly constructed, these pulsators have been so arranged as to pulsate the four teat-cups comprising the set, simultaneously, that is to say, the whole four cups have been connected at the same time, first with the atmosphere, and then with the vacuum. This method has, however, been open to the objection that it produces an intermittent demand upon the udder in consequence of the fact that the milk is drawn simultaneously from all four teats during one stage of the pulsation. To avoid this objection, it has been proposed hitherto to employ a double pulsation, that is to say one in which two of the teat-cups are connected with the vacuum at the moment the remaining two are connected with the atmosphere. This method of double pulsation, however, although a distinct improvement upon the single pulsation, has failed to produce a continuous flow of milk.

It is the object of the present invention, therefore, to overcome this objection by providing a claw-pulsator adapted to be operated mechanically by means of a flexible shaft from the line-shafting of the shed, such pulsator being adapted to produce a quadruple pulsation, that is to say, a cycle of operations in which four changes from atmospheric pressure to vacuum occur at four equal intervals, and which four pulsators are communicated one to each of the teat-cups by means of four separate pulsation passages.

In carrying this object into effect, the construction consists essentially of a lower chamber maintained under continuous vacuum, and provided with the necessary connections or stumps for receiving the milk from the teat-cups and delivering such milk to the milk receiver, whether a bucket or milk-releaser as the case may be, and an upper portion mounted upon said chamber, and provided with four stumps, the passages of which are connected with the pulsation-chambers of the four teat-cups respectively. In the said upper portion also is revolubly mounted a rotor actuated by means of a flexible shaft from the line-shafting of the shed, such rotor being adapted when so operated, to effect a change from atmospheric pressure to vacuum in one of the said pulsation-chambers at approximately each quarter of a revolution. Thus, in the course of one complete revolution, the rotor will perform a cycle of operations in which each of the teat-cups comprising the set will be pulsated once.

In order that the nature of the invention may be fully understood, reference will now be made to the accompanying sheet of drawings in which:—

Figure 1 is view taken on the line I—I of Fig. 2, showing in section and elevation one form of pulsator embodying my invention.

Fig. 2 is a horizontal section of the same,

Fig. 3 is a sectional view similar to Fig. 2, but with the pulsator inverted and the rotor in elevation.

Fig. 4 shows a rotor removed from the casing.

Fig. 5 is a view of the parts of Fig. 2 with the rotor removed, to show the ports in the liner certain of which communicate with the passages in the stumps leading to the pulsation-chambers of the four teat cups, these stumps not projecting up above the cutting plane.

Fig. 6 is a cross-section through a pulsator illustrating an alternative form to that of Figs. 1, 2, 3, 4 and 5.

Fig. 7 shows the rotor employed in the form illustrated in Fig. 6, as viewed from beneath.

1 is a lower chamber maintained under continuous vacuum, and provided with four stumps 2 to receive the flexible milk-tubes from the teat-cups. Each stump is provided with a ball-end to afford a means for frictionally but securely attaching the milk-tubes.

Mounted on top of the chamber 1 and clamped in place by means of a screw or bolt 3, passing through such chamber, is a second chamber 4 which is provided with four stumps, 5, 6, 7, and 8 each provided with a ball-end to afford a means for frictionally but securely attaching the four flexible pulsation tubes of the four teat-cups respectively.

Referring now to Figs. 1, 2, 3, 4 and 5, the interior of the chamber 4 is formed with a circular bore, or as here shown, provided with a liner 9 through which are formed four ports 10, 11, 12 and 13 communicating respectively with the passages of the said stumps 5, 6, 7, and 8.

The ports 10 and 11 are arranged in line parallel with the axis of the bore; and at a distance therefrom equal or approximately equal to one quarter of the interior circumference of the liner are similarly arranged the ports 12 and 13.

Formed through the said liner 9 in line with, in an axial direction, the ports 10 and 11, is a port 17 which is in communication through the passage 19 with the chamber 1, and in like manner with the ports 12 and 13, and approximately equidistant therefrom is a port 18 which is in communication through the passage 20 with the said chamber 1.

Revolubly mounted within the said liner is a cylindrical rotor 14 adapted to be actuated by means of a flexible shaft 15 from the line shafting of the shed. The said rotor is formed with a hollow core 16 which is in free communication with the atmosphere, as at 16ª.

The said rotor 14 is formed around approximately one half of its periphery with a series of holes or a slot 21 adapted to come into register with either of the ports 10 and 13, and so place either of the stumps 5 or 8 in communication with the atmosphere, while at the opposite end of the same half of the periphery of such rotor is formed a series of grooves or recesses 22 disposed parallel with the axis and adapted to come into register with, and so connect the port 11 with the port 17, or the port 12 with the port 18, thus placing the stump 6 or the stump 7 in communication with the vacuum of the chamber 1. The said rotor is formed around the other half of its periphery in a similar manner, but arranged in the reverse order, that is to say, a series of holes or a slot 23 is provided and adapted to register either with the port 11, or the port 12, and so place the stump 6 or the stump 7 in communication with the atmosphere and a series of grooves or recesses 24 are provided and adapted to connect either the port 10 with the port 17, or the port 13 with the port 18 thus connecting either the stump 5 or the stump 8 with the vacuum of the chamber 1.

As shown in Fig. 1, the first of the series of grooves 22 is in register with and so establishes communication between the ports 11 and 17, thus placing the inflation of the teat-cup connected with the stump 6 in communication with the vacuum, while the slot 23 is in register with the port 12, and therefore, places the inflation of the teat-cup connected with the stump 7 in communication with the atmosphere. When in this position also, one of the series of grooves 24 is in register with, and so provides communication between the ports 13 and 18, thus placing the inflation of the teat-cup connected with the stump 8 in communication with the vacuum, while the slot 21 is in register with the port 10, thus placing the inflation of the teat-cup connected with the stump 5 in communication with the atmosphere. Upon the rotor being turned one quarter of a revolution in the direction indicated by the arrow, the slot 23 will be clear of the port 12 and the first of the series of grooves 22 will come into register with and so establish communication between the ports 12 and 18, thus effecting the change from atmospheric pressure to vacuum in the inflation of the teat-cup connected with the stump 7, while by reason of the fact that the same series of grooves still continue to register with the ports 11 and 17, the inflation of the teat-cup connected with the stump 6 will continue in communication with the vacuum. At this stage also, the series of grooves 24 will be clear of the ports 13 and 18, and the slot 21 will be in register with the port 13, thus placing the inflation of the teat-cup connected with the stump 8 in communication with the atmosphere, while as the same slot 21 still registers with the port 10 the inflation of the teat-cup connected with the stump 5 will remain in communication with the atmosphere.

Upon the rotor being again turned through another quarter of a revolution in the same direction, the slot 21 will be clear of the port 10, and the first of the series of grooves 24 will register with and so provide communication between the ports 10 and 17, thus effecting the change from atmospheric pressure to vacuum in the inflation of the teat-cup connected with the stump 5, while the slot 21 will still be in register with the port 13, and consequently the inflation of the teat-cup connected with the stump 8 will remain in communication with the atmosphere.

At this stage also the series of grooves 22 will be clear of the ports 11 and 17, while the slot 23 will be in register with the port 11, and consequently a change from vacuum to atmospheric pressure will occur in the inflation of the teat-cup connected with the stump 6.

At this stage also, the series of grooves 22 will still be in register with the ports 12 and 18 and consequently the inflation of the teat-cup connected with the stump 7 will remain in communication with the vacuum.

Upon the rotor being again turned through a quarter of a revolution in the same direction, the slot 21 will be clear of the port 13, and the first of the series of grooves 24 will register with and so provide communication between the ports 13 and 18, thus effecting the change from atmospheric pressure to vacuum in the inflation of the teat-cup connected with the stump 8, while the same series of grooves will still be in register with the ports 10 and 17 and consequently the inflation of the teat-cup connected with the stump 5 will remain in communication with the vacuum. While at this stage also the series of grooves 22 will be clear of the ports 12 and 18 and the slot 23 will be in register with the port 12, and in consequence, a change from vacuum to atmospheric pressure will occur in the inflation of the teat-cup connected with the stump 7, while the slot 23 will still be in register with the port 11, and consequently the inflation of the teat-cup connected with the stump 6 will remain in communication with the atmosphere. Upon the rotor being again turned through another quarter of a revolution in the same direction, it will have completed its cycle and again assumed the position first described.

It will be understood therefore, that as the rotor revolves in the manner described in detail above, it will produce four separate pulstations which occur at equal intervals in the cycle, and which are communicated one to each of the teat-cups by four separate and independent pulsation passages.

Referring now to the modification shown in Figs. 6 and 7. The lower chamber 1 is precisely similar to that already described. In this case also, the upper chamber 4 is mounted upon the chamber 1 and secured by means of a screw or bolt 3, through which is an axial hole adapted to receive the actuating shaft 26.

In this modification, however, in lieu of the cylindrical bore, the upper chamber 4 is formed with a bowl-shaped recess, or, as here shown, such chamber is provided with a liner in which such recess is formed. Revolubly mounted in the said recess and adapted to make an air-tight seating therewith, is a hemispherical rotor 25, which is actuated by means of a flexible shaft 26 passing upward through the bolt 3.

The said rotor 25 instead of being hemispherical may however, be egg-shaped, conical, or any development of such, or may again take the form of a flat plate or disk, the recess in the liner being in each case correspondingly formed to receive it and provide an airtight seating.

Through the said liner are formed in line and at equal intervals around the periphery, or in the case where a disk rotor is employed at equal intervals around a common radius from the center, four ports 28, 29, (not shown) 30 and 31 (not shown) communicating respectively with the four stumps 5, 6, 7, and 8, in a similar manner to that already described, while at a point nearer the center, such liner is formed with one or more ports 32 communicating with the lower chamber 1.

The rotor is formed with a hollow core which is in free communication with the atmosphere as by means of a port or opening 25ª formed through the top of the casing as shown in dotted lines Fig. 5.

The rotor 25 is formed around one half or approximately one half of its periphery in the case of a hemisphere, cone or the like, or around one half of its surface in the case of a disk, with a slot or series of holes 33 arranged in line and adapted to register in turn with each of the ports 28, 29, 30 and 31 so as to provide communication between their respective stumps and the atmosphere.

Around the corresponding portion of the other half of the rotor, and in the underside of such is formed a groove or recess 34 adapted to register with the said four ports in a manner similar to that of the slot or series of holes, 33, such groove 34 being in communication through a radial groove 35, with an annular groove 36 extending around the rotor at the required radius to register with the port or ports 32.

The arrangement is such therefore, that as the rotor revolves the forward end of the slot 35 at each quarter of such revolution, comes into register with each of the ports 28, 29, 30 and 31 in turn, and thus provides a cycle of pulsation exactly similar to that already described in connection with the form of the invention shown in the preceding figures.

I claim:

1. In a claw pulsator, the combination with a lower chamber maintained under continuous vacuum, of an upper chamber mounted thereon, and provided with four pulsation passages communicating one with each of the four teat-cups comprising the set, the said chamber being formed with a bore or seating and having four ports communicating between the said bore and the four said pulsation passages respectively and a port or ports communicating between the said bore and the vacuum of the lower chamber, and a rotor adapted to be received by said bore or seating, and to be rotated by means of a flexible shaft, said rotor being so formed as to place the said four ports alternately in communication with the said vacuum port or ports and the atmosphere alternately in such a manner as to produce four separate pulsations in which one of the said pulsation passages is brought into communication with the vacuum at each quarter of a revolution of the rotor.

2. A claw pulsator having separate and independent pulsation passages adapted to connect with the respective teat-cups and a chamber maintained under continuous vacuum, and means for successively connecting the pulsation passages with atmosphere and then with the vacuum chamber.

3. A claw pulsator comprising a casing, a partition in said casing dividing said casing into two chambers, one of said chambers being maintained under continuous vacuum and adapted to receive the milk from teatcups, the other chamber adapted to be connected with pulsation chambers of the teatcups and with the atmosphere, a rotor in the last mentioned chamber having ports formed therein and coöperating with ports formed in said partition, means for continuously rotating said rotor whereby said ports therein will be caused to actuate to successively connect each pulsation chamber with atmosphere and then with the vacuum chamber.

In testimony whereof I affix my signature in presence of two witnesses.

WILLIAM ABRAM BLACKMORE.

Witnesses:
SIDNEY JAMES TRELEAVEN.
PERCY RICHMOND CLIMIE,